United States Patent
Blume et al.

(10) Patent No.: US 8,396,742 B1
(45) Date of Patent: Mar. 12, 2013

(54) SYSTEM AND METHOD FOR OPTIMIZING PAID SEARCH ADVERTISING CAMPAIGNS BASED ON NATURAL SEARCH TRAFFIC

(75) Inventors: Matthias Blume, San Diego, CA (US); Raul Navarro-Cantu, San Diego, CA (US); Craig Macdonald, Encinitas, CA (US); Dema Zlotin, La Jolla, CA (US); Russ Mann, Temecula, CA (US)

(73) Assignee: Covario, Inc., San Diego, CA (US)

( * ) Notice: Subject to any disclaimer, the term of this patent is extended or adjusted under 35 U.S.C. 154(b) by 175 days.

(21) Appl. No.: 12/329,391

(22) Filed: Dec. 5, 2008

(51) Int. Cl.
*G06Q 30/00* (2012.01)

(52) U.S. Cl. .................. 705/14.1; 705/14.4; 705/14.41; 705/14.43; 705/14.45; 705/14.52; 705/14.54; 705/14.73; 705/14.42

(58) Field of Classification Search .............. 705/14
See application file for complete search history.

(56) References Cited

U.S. PATENT DOCUMENTS

| | | | |
|---|---|---|---|
| 6,401,075 B1 | 6/2002 | Mason et al. | |
| 6,654,725 B1 | 11/2003 | Langheinrich et al. | |
| 6,810,356 B1 * | 10/2004 | Garcia-Franco et al. | 702/179 |
| 6,925,442 B1 | 8/2005 | Shapira et al. | |
| 7,043,450 B2 * | 5/2006 | Velez et al. | 705/37 |
| 7,185,085 B2 | 2/2007 | Bean | |
| 7,206,838 B2 | 4/2007 | Boyd et al. | |
| 7,225,246 B2 | 5/2007 | Shapira | |
| 7,343,412 B1 | 3/2008 | Zimowski | |
| 2002/0032608 A1 | 3/2002 | Kanter | |
| 2002/0073199 A1 | 6/2002 | Levine et al. | |
| 2002/0082901 A1 | 6/2002 | Dunning et al. | |
| 2002/0083188 A1 | 6/2002 | Hericy et al. | |
| 2002/0112048 A1 | 8/2002 | Gruyer et al. | |
| 2002/0154163 A1 | 10/2002 | Melchner | |
| 2002/0161648 A1 | 10/2002 | Mason et al. | |
| 2003/0014519 A1 | 1/2003 | Bowers et al. | |

(Continued)

FOREIGN PATENT DOCUMENTS

| | | |
|---|---|---|
| WO | 2004003701 A2 | 1/2004 |
| WO | 2004079551 A1 | 9/2004 |

(Continued)

OTHER PUBLICATIONS

Newnan, Donald G., Ted G. Eschenbach, and Jerome P. Lavelle. "Rate of Return Analysis." Engineering Economic Analysis. 9th ed. New York: Oxford UP, 2004. 238. Print.*

(Continued)

*Primary Examiner* — John Weiss
*Assistant Examiner* — Vincent Cao
(74) *Attorney, Agent, or Firm* — Cooley LLP

(57) ABSTRACT

The invention is a computer-implementable methodology for quantitatively assessing the impact of paid search advertising on the total visits (paid and organic search-based visits) from search engines and utilizing this assessment to improve search engine marketing performance. The methodology relies on the computation of a synergy score for each search engine keyword of interest or coefficients in a synergy equation. Once computed, the score can be used to repeatedly compute the total return on advertising spend (ROAS) and other performance metrics on a go-forward basis without the time lag inherent in computing the synergy score itself. The invention includes specific computer-implementable methods for improving search engine marketing performance based on the total (paid plus organic) performance metrics.

50 Claims, 10 Drawing Sheets

U.S. PATENT DOCUMENTS

| | | | |
|---|---|---|---|
| 2003/0046389 A1 | 3/2003 | Thieme | |
| 2003/0074252 A1 | 4/2003 | Chandler-Pepelnjak et al. | |
| 2003/0105677 A1 | 6/2003 | Skinner | |
| 2003/0172349 A1 | 9/2003 | Katayama et al. | |
| 2003/0208578 A1 | 11/2003 | Taraborelli et al. | |
| 2004/0059625 A1 | 3/2004 | Schrader | |
| 2004/0093259 A1* | 5/2004 | Pych | 705/10 |
| 2004/0107137 A1 | 6/2004 | Skinner | |
| 2004/0148307 A1 | 7/2004 | Rempell | |
| 2004/0181457 A1* | 9/2004 | Biebesheimer et al. | 705/26 |
| 2004/0215509 A1 | 10/2004 | Perry | |
| 2004/0215515 A1 | 10/2004 | Perry | |
| 2004/0225562 A1 | 11/2004 | Turner | |
| 2005/0010475 A1 | 1/2005 | Perkowski et al. | |
| 2005/0065928 A1 | 3/2005 | Mortensen et al. | |
| 2005/0137939 A1 | 6/2005 | Calabria et al. | |
| 2005/0144064 A1* | 6/2005 | Calabria et al. | 705/14 |
| 2005/0149396 A1 | 7/2005 | Horowitz et al. | |
| 2005/0209920 A1 | 9/2005 | Stubbs et al. | |
| 2005/0234953 A1 | 10/2005 | Zhang et al. | |
| 2005/0256954 A1 | 11/2005 | Shapira et al. | |
| 2005/0262050 A1 | 11/2005 | Fagin et al. | |
| 2005/0288954 A1 | 12/2005 | McCarthy et al. | |
| 2006/0026128 A1 | 2/2006 | Bier | |
| 2006/0041480 A1* | 2/2006 | Briggs | 705/14 |
| 2006/0069663 A1 | 3/2006 | Adar et al. | |
| 2006/0080239 A1 | 4/2006 | Hartog | |
| 2006/0080321 A1 | 4/2006 | Horn et al. | |
| 2006/0085408 A1 | 4/2006 | Morsa | |
| 2006/0117002 A1 | 6/2006 | Swen | |
| 2006/0129453 A1 | 6/2006 | Gardner et al. | |
| 2006/0167749 A1 | 7/2006 | Pitkow et al. | |
| 2006/0173822 A1 | 8/2006 | Watson et al. | |
| 2006/0253345 A1 | 11/2006 | Heber | |
| 2007/0027754 A1* | 2/2007 | Collins et al. | 705/14 |
| 2007/0027762 A1* | 2/2007 | Collins et al. | 705/14 |
| 2007/0067217 A1 | 3/2007 | Schachter et al. | |
| 2007/0067331 A1 | 3/2007 | Schachter et al. | |
| 2007/0112959 A1 | 5/2007 | Bean | |
| 2007/0156621 A1* | 7/2007 | Wright et al. | 706/48 |
| 2007/0203789 A1 | 8/2007 | Jain et al. | |
| 2007/0255754 A1 | 11/2007 | Gheel | |
| 2007/0288454 A1 | 12/2007 | Bolivar et al. | |
| 2007/0288514 A1 | 12/2007 | Reitter et al. | |
| 2008/0010142 A1 | 1/2008 | O'Brien et al. | |
| 2008/0104113 A1 | 5/2008 | Wong et al. | |
| 2008/0109318 A1 | 5/2008 | Szmanda | |
| 2008/0133500 A1 | 6/2008 | Edwards et al. | |

FOREIGN PATENT DOCUMENTS

WO 2005052755 A2 6/2005

OTHER PUBLICATIONS

Wilson, Bill. "The Machine Learning Dictionary." Cse.unsw.edu.au. University of Southern Wales, Aug. 30, 2000. Web. Dec. 6, 2010. <http://www.cse.unsw.edu.au/~billw/mldict.html>.*

Newnan, Donald G., Ted G. Eschenbach, and Jerome P. Lavelle. "Rate of Return Analysis." Engineering Economic Analysis. 9th ed. New York: Oxford UP, 2004.238. Print.*

Boggs, Chris. "Do You Know the Breakdown of Your Comeptitors' Paid and Organic Traffic? Hitwise Does." The Search Engine Roundtable. Mar. 18, 2008. RustyBrick. May 22, 2012 /www.seroundtable.com/archives/016591 .html>.*

Wilson, Bill. "The Machine Learning Dictionary." Cse.unsw.edu.au. University of Southern Wales, Aug. 30, 2000. Web. Dec. 6, 2010. / www.cse.unsw.edu.au/~billw/mldict.html>.*

Jutla et al., "Developing Internet E-Commerce Benchmarks" In Systems Archive. vol. 24, Issue 6 (Sep. 1999) Special issue on information systems support for electronic commerce, p. 475-493. Year of Publ. 1999 [retrieved on Jul. 17, 2007]. Retrieved from the internet, URL: http://www.e-gov.gr/local/ism-egov/resources-egov/information%20Systems%20-%Developing%20Internet%20eCommerce%20Benchmarks.pdf>.

PCT/US07/062736 International Search Report and Written Opinion mailed Oct. 2, 2007.

PCT/US07/076798 International Search Report and Written Opinion mailed Oct. 3, 2008.

PCT/US07/086552 International Search Report and Written Opinion mailed Oct. 31, 2008.

PCT/US07/086553 International Search Report and Written Opinion mailed Nov. 3, 2008.

U.S. Appl. No. 11/689,406 Final Rejection mailed Apr. 27, 2010.
U.S. Appl. No. 11/689,406 Non-Final Rejection mailed Oct. 26, 2009.
U.S. Appl. No. 11/689,406 Non-Final Rejection mailed Apr. 15, 2009.
U.S. Appl. No. 11/689,414 Final Rejection mailed Jul. 30, 2009.
U.S. Appl. No. 11/689,414 Final Rejection mailed May 20, 2009.
U.S. Appl. No. 11/689,414 Non-Final Rejection mailed Jan. 8, 2009.
U.S. Appl. No. 11/678,002 Non-Final Rejection mailed Feb. 1, 2012.
U.S. Appl. No. 12/970,781 Non-Final Rejection mailed Feb. 14, 2012.

* cited by examiner

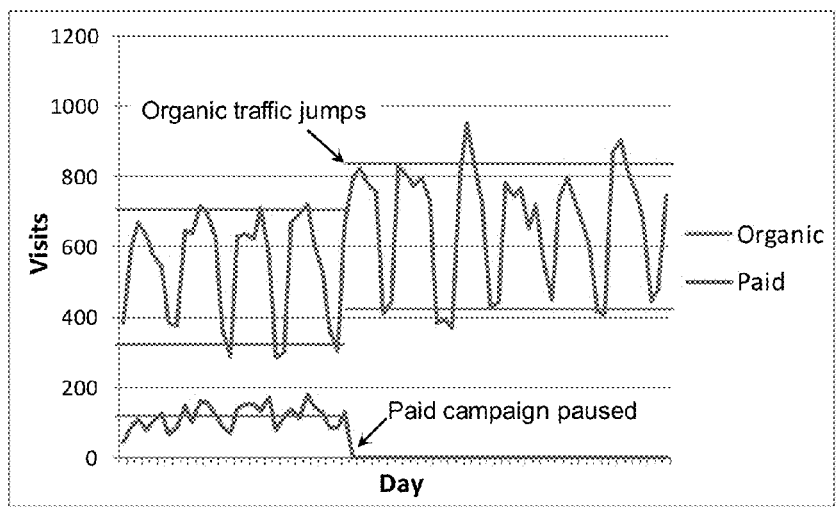
FIGURE 4
| Organic clicks | Paid clicks | Query volume | CTR$_O$ | CTR$_P$ |
|---|---|---|---|---|
| 5493 | 831 | 66500 | 8.26% | 1.25% |
| 5511 | 756 | 65500 | 8.41% | 1.15% |
| 5305 | 793 | 63500 | 8.35% | 1.25% |
| 5609 | 696 | 65500 | 8.56% | 1.06% |
| 7088 | 0 | 71500 | 9.91% | 0.00% |
| 6709 | 0 | 71500 | 9.38% | 0.00% |
| 7494 | 0 | 82000 | 9.14% | 0.00% |
| 6871 | 261 | 75000 | 9.16% | 0.35% |
| 6259 | 969 | 76500 | 8.18% | 1.27% |
| 7533 | 1075 | 78500 | 9.60% | 1.37% |
FIGURE 5
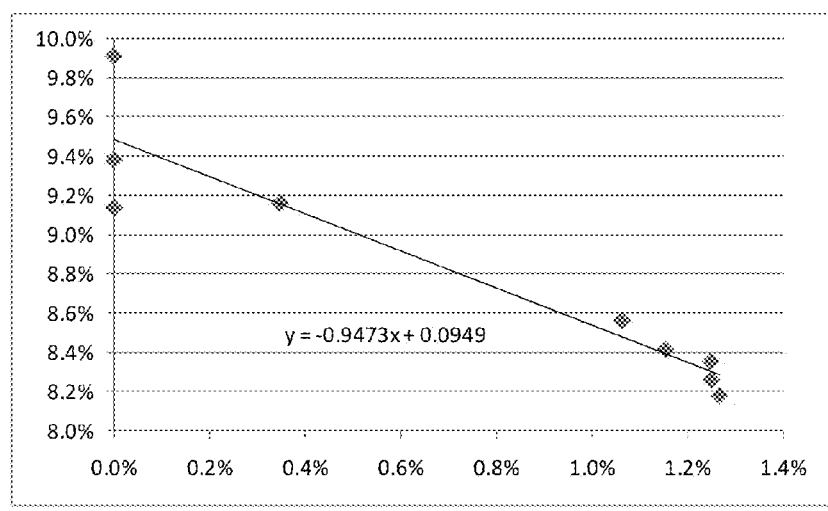
FIGURE 6

SYSTEM AND METHOD FOR OPTIMIZING PAID SEARCH ADVERTISING CAMPAIGNS BASED ON NATURAL SEARCH TRAFFIC

CROSS-REFERENCE TO RELATED APPLICATIONS

This application relates to and incorporates by reference U.S. patent application Ser. No. 11,678,002, entitled "System and Method for Managing Network-Based Advertising Conducted by Channel Partners of an Enterprise," filed on Feb. 7, 2007, U.S. patent application Ser. No. 11/689,406, entitled, "Centralized Web-Based Software Solutions For Search Engine Optimization," filed on Mar. 21, 2007, U.S. patent application Ser. No. 11/689,414, entitled "A System and Method for Measuring the Effectiveness of an On-Line Advertisement Campaign," filed on Mar. 21, 2007, U.S. patent application Ser. No. 11/758,592, entitled "System And Method For Modeling Value Of An On-Line Advertisement Campaign," filed on Jun. 5, 2007.

FIELD OF THE INVENTION

The invention is directed to, among other things, methods and systems for modeling and optimizing the effectiveness of a paid search advertising campaign. In particular, but not by way of limitation, aspects of the invention pertain to one or more centralized web-based software solutions that measure the effects of a change to a paid search advertising campaign.

BACKGROUND OF THE INVENTION

When a user wishes to find information on the World Wide Web, he or she may enter a query in a search engine. In response to each query, the search engine may return two types of results: organic (also known as natural) search results and paid search results. Organic search results are those listings that the search engine shows without direct compensation from a third party. Paid search results are advertisements that are only shown so long as the advertiser pays the search engine. Paid search results are often labeled as "sponsored ads," "sponsored links" or "sponsored results." The paid search results often appear adjacent to or above the organic search results, but may appear anywhere on the search engine results page (SERP). By way of example, FIG. 1 and FIG. 2 show two SERPs, including organic and paid results Search engines provide each advertiser with a great deal of control over where the advertisers' ads appear and where they do not appear. Returning to FIG. 1, the company "United Auto Body and Paint" may bid on search terms such as "united," "automobile," "collision repair" and/or "united auto body and paint". Many search engines allow the advertiser to pay a greater amount per impression or per click on an advertisement in order for the advertisement to appear in a better position on the page (e.g., a higher position in the list of paid search results). The advertiser can specify that each ad be shown to users located anywhere in the world or restricted to specific geographic regions, such as only users in San Diego, Calif.

Due to finite budgets, no advertiser can afford to have their listing appear on every SERP. Instead, advertisers typically examine the actions taken by users and only show their ads in scenarios where the return on advertising spend (ROAS) is sufficient. The ROAS is defined as the value of the actions (such as purchasing a product, viewing a webpage, or downloading a white paper) taken by users as a result of a set of advertisements divided by the cost of those advertisements. Similar metrics include return on investment (ROI), cost per acquisition (CPA), cost per success event, cost per value point, and expense to revenue ratio (E/R). Data about the number of impressions served of each search advertisement and the cost of these advertisements is obtained from the search engines such as Google, Yahoo, and MSN. Data about the actions taken by users (conversion data) is obtained from "Web analytics" systems that track usage of the advertiser website. Leading Web analytics products include Coremetrics, Google Analytics, Omniture SiteCatalyst, Unica NetInsight, and WebTrends Marketing Lab.

Currently, if a user clicks on an advertisement and then takes actions on the advertiser's webpage, most advertisers attribute the value of the actions taken to that advertisement. Returning to FIG. 2, if a user clicks on the "Economist.com/subscribe" advertisement and purchases a subscription on the target website, The Economist probably considers this revenue to result from the advertisement. Supposing that The Economist pays $1 per click on the advertisement, 10% of users who click on the advertisement actually purchase a subscription, and The Economist's net income per additional subscription is $40, The Economist would calculate the ROAS as 10%*$40/$1=4.0. However, a basic premise of the above calculation is flawed because the revenue does not necessarily result from the advertisement.

Therefore, it would be advantageous to understand the true value of an advertisement and to communicate that value to an advertiser.

Moreover, assessment of the impact of various advertising campaigns and programs such as television, magazine, online display ads, and search engine ads is commonly carried out via user surveys and other techniques such as marketing mix modeling. These techniques may be able to assess the effects of major campaigns on a company's key performance metrics such as revenue or website visits, but they cannot handle more granular marketing actions, such as the impact of showing an ad in response to a particular search engine query. Marketing mix modeling typically utilizes two to three years of historical data in the statistical analysis and is generally not used to assess the effect of a routine marketing change implemented for a period of less than one day to two weeks. Finally, surveys and marketing mix modeling both rely heavily on human expertise and custom analysis and do not appear to be well suited to automation.

Therefore, it would be advantageous to automate the assessment of the impacts of various advertising campaigns and programs. Moreover, it would be advantageous to assess impacts of various advertising campaigns using smaller data sets and/or real-time or recent data.

SUMMARY

Exemplary embodiments of the invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one aspect, the invention provides a system and method for determining an impact of a change to a paid search advertising campaign. The inventive systems and methods include certain embodiments that identify a change associated with the paid search advertising campaign and determine one or more effects resulting from the change. The one or more effects are processed after they are identified. The processing results in a synergy score, which is stored in memory. In relation to another aspect of the invention, certain embodiments generate a mathematical model for determining an estimated synergy. In relation to yet another aspect of the invention, certain embodiments determine an adjustment to be made to the paid search advertising campaign based on the calculated synergy score, the mathematical model or both the calculated synergy score and the mathematical model. Additional aspects are further described in the detailed description and drawings.

BRIEF DESCRIPTION OF THE DRAWINGS

Various objects and advantages and a more complete understanding of the invention are apparent and more readily appreciated by reference to the following Detailed Description and to the appended claims when taken in conjunction with the accompanying Drawings wherein:

FIG. 4 shows a pictorial representation of paid and organic website traffic over a period of approximately ten weeks in accordance with at least one embodiment of the invention;

FIG. 5 shows a table representative of a portion of data gathered in accordance with at least one embodiment of the invention;

FIG. 6 shows a linear fit to a plot of organic and paid search click-through rates in accordance with at least one embodiment of the invention;

DETAILED DESCRIPTION OF EMBODIMENTS OF THE INVENTION

Embodiments of the present invention include methodologies and systems for quantitatively assessing the impact of paid search advertising on the total visits (paid and organic visits) from search engines and utilizing this assessment to improve search engine marketing performance. Certain embodiments rely on the computation of a synergy score for select search engine keywords of interest or coefficients in a synergy equation. This computation may utilize historical data from a given time period (e.g., less than one day to two weeks). Once computed, the score can be used to repeatedly compute the total ROAS and other performance metrics on a go-forward basis without the time lag inherent in computing the synergy score itself.

Figure 1:
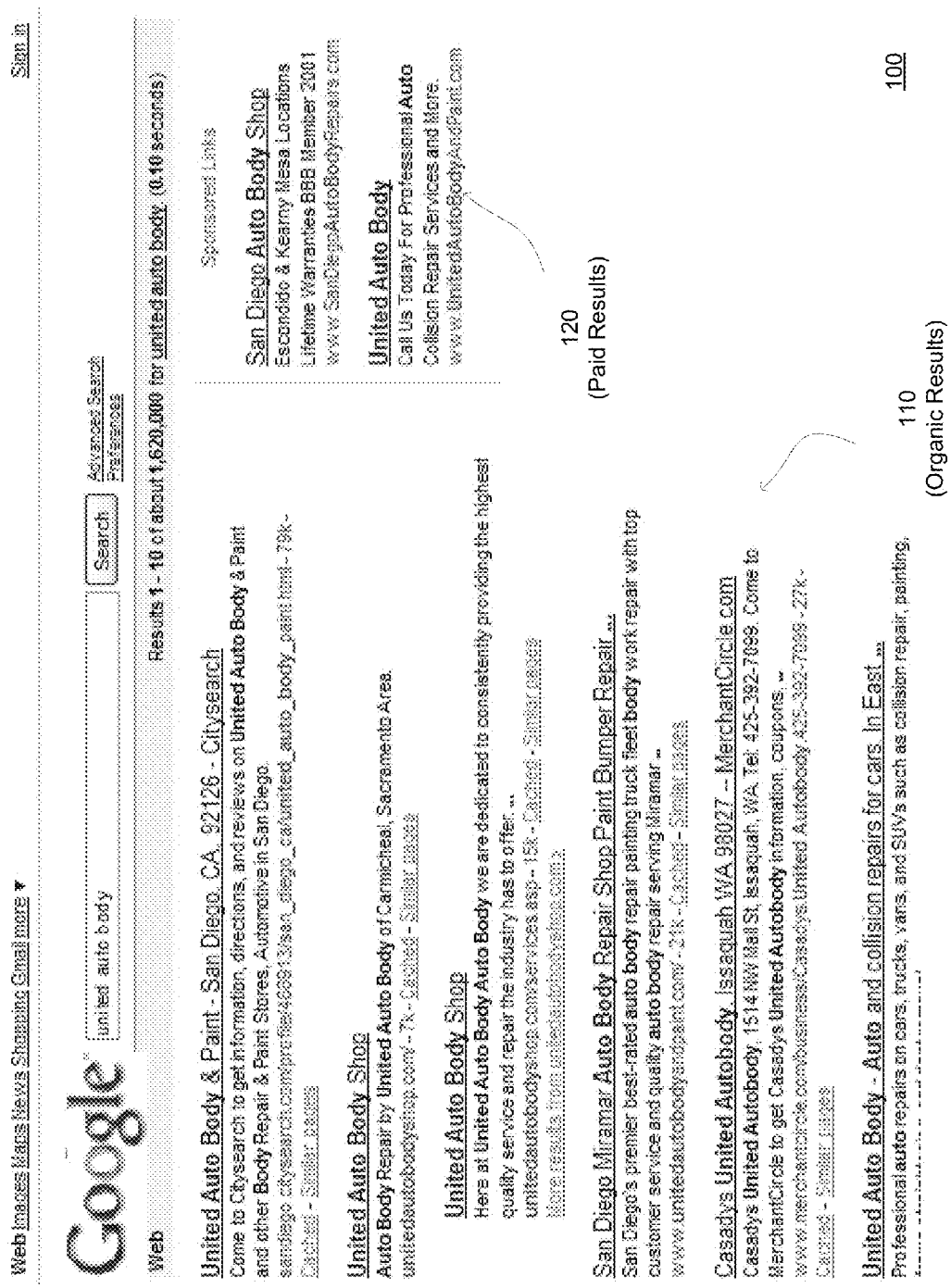
FIG. 1 shows a typical search engine results page for Google.
Figure 2:
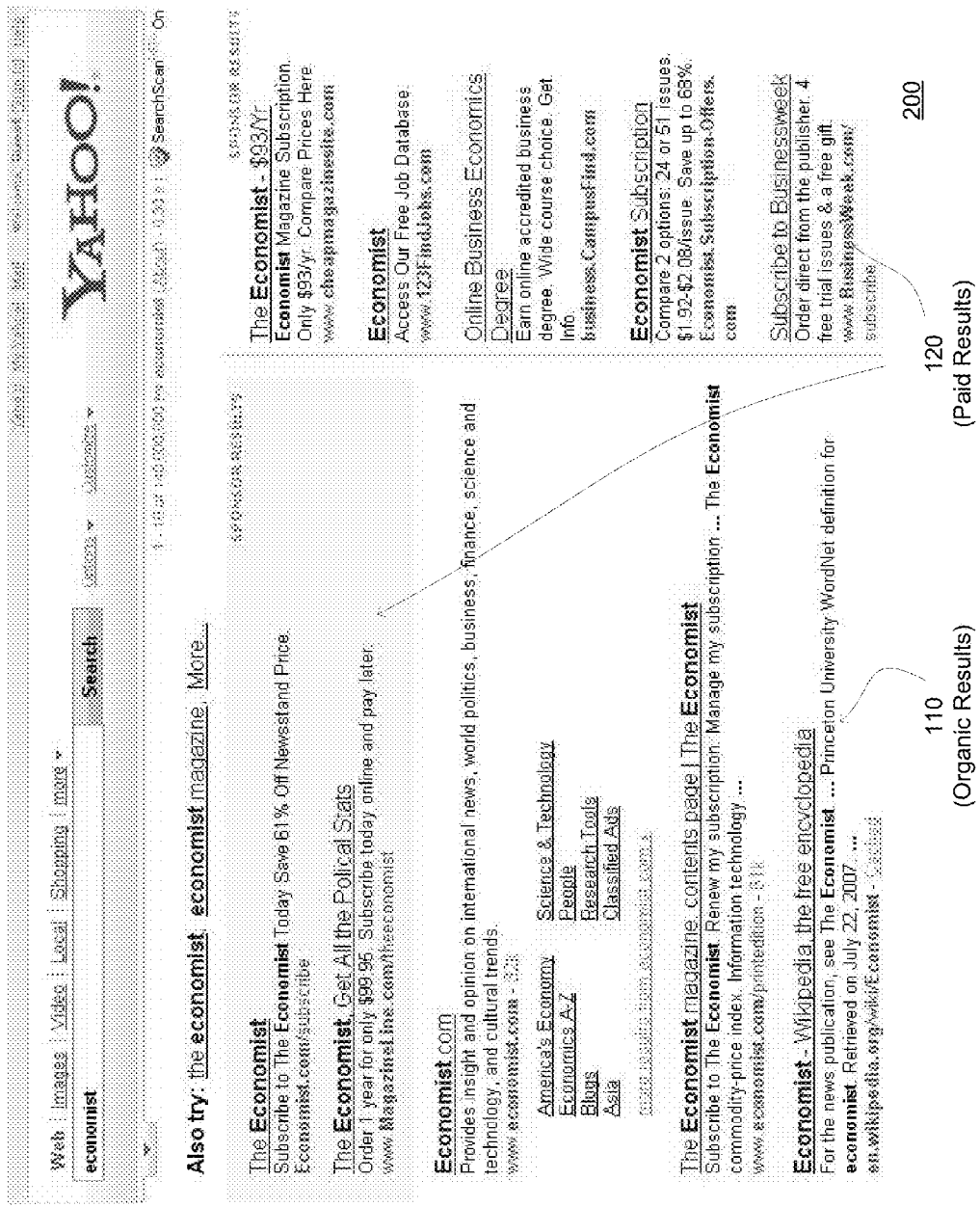
FIG. 2 shows a typical search engine results page for Yahoo.

A closer look at FIG. 2 indicates that the basic premise of the typical ROAS calculation described previously in the Background section is flawed because the revenue does not necessarily result from the advertisement in the paid listings 120. Instead, the user could click any of several other links appearing on the SERP and still purchase a subscription to The Economist. For example, the user could click on the organic listing 110 of the website. Thus, if The Economist chose not to purchase the search ad, a substantial fraction of the traffic and revenue currently captured by the ad would probably shift to organic search listing 110. Similarly, in FIG. 1 it is conceivable that the www.UnitedAutoBodyAndPaint-.com sponsored link improves the awareness of this business and drives additional traffic to the www.unitedautobodyandpaint.com organic listing. Correctly calculating ROAS (or any other value metric) requires assessing the impact of the advertisement on the advertiser's overall traffic and revenue, not just on traffic via the paid link itself.

When considering traffic to all of the links appearing on the SERP, it is helpful to recognize that these links include links to websites operated by the advertiser, affiliates of the advertiser (third parties who direct some of their visitors to the advertiser's websites for a fee), resellers of the advertiser's products or services, competitors of the advertiser and entities unrelated to the advertiser (e.g., the query "united" may return links to United Airlines, which has nothing to do with United Auto Body and Paint). The links also include links to information sources (e.g., Wikipedia), which may or may not contain links to the websites operated by the advertiser. Any of these links may occur as advertisements or appear organically. Finally, in addition to clicking on one or more of the links, the user has the option of not clicking on any link.

An advertiser's Web analytics system tracks and distinguishes between visitors arriving at the advertiser's websites via paid and organic links. The Web analytics system records which search engine the visitor was using, what their query into the search engine was, what landing page the link took them to, and (if tracking codes are configured appropriately in the search engine's advertising interface) what creative was shown for a paid ad on which the user clicked. The Web analytics system also tracks traffic from affiliates' websites and information sources.

Certain embodiments of the invention compute a synergy score or coefficients in a synergy equation. Certain embodiments may additionally generate or alternatively generate holistic performance metrics similar to the "paid only" metrics that search engine marketers use today, and then use those metrics to optimize search engine marketing performance.

Computation of the Synergy Score or Synergy Equation

A synergy score quantifies the impact of paid search advertisements on traffic levels resulting from organic search listings and/or the value (e.g., revenue) associated with that traffic.

The synergy score can be defined and scaled in numerous ways. In one embodiment, the synergy score is calculated on a linear scale. A synergy score of 0.0 indicates that changes in paid search advertising have no impact on traffic via organic search listings. A synergy score of −1.0 indicates that changing the paid search advertising to attract X additional visitors (or Y revenue or some other value metric) via paid search listings has an equal and opposite effect on the same value metric (e.g., additional visitors, revenue, etc.) for organic search listings. For example, the change reduces the number of visitors via organic search listings by X. A synergy score of 1.0 indicates that changing the paid search advertising to attract X additional visitors via the paid search listing also attracts an additional X visitors via organic search listings. A synergy score of −0.5 means that changing the paid search advertising to attract X additional visitors via the paid search listing reduces the number of visitors via the organic search listings by 0.5*X. This score can then be used to evaluate and/or modify advertising campaigns.

In this and other embodiments, a different method of scoring may be defined without changing the fundamental definition and characteristic of a synergy score as quantifying the impact of paid search advertisements on traffic or revenue from organic search listings of a website at one or more search engines.

For each advertiser, a different synergy score may be determined for each search engine query and in relation to each search engine. For example, the synergy score for The Economist advertising on the search term "economist" would probably be different on Google search than on Yahoo! search. Also, the synergy score for The Economist advertising on the search term "economist" on Google would be different than the synergy score for The Economist advertising on the search term "Alan Greenspan" on Google.

In addition, a different synergy score may be determined for different entities using the same search term. For example, the synergy score for The Economist advertising on the search term "economist" on Google would be different than the synergy score for United Auto Body and Paint advertising on the search term "economist" on Google.

Synergy Score Calculation

Figure 3:
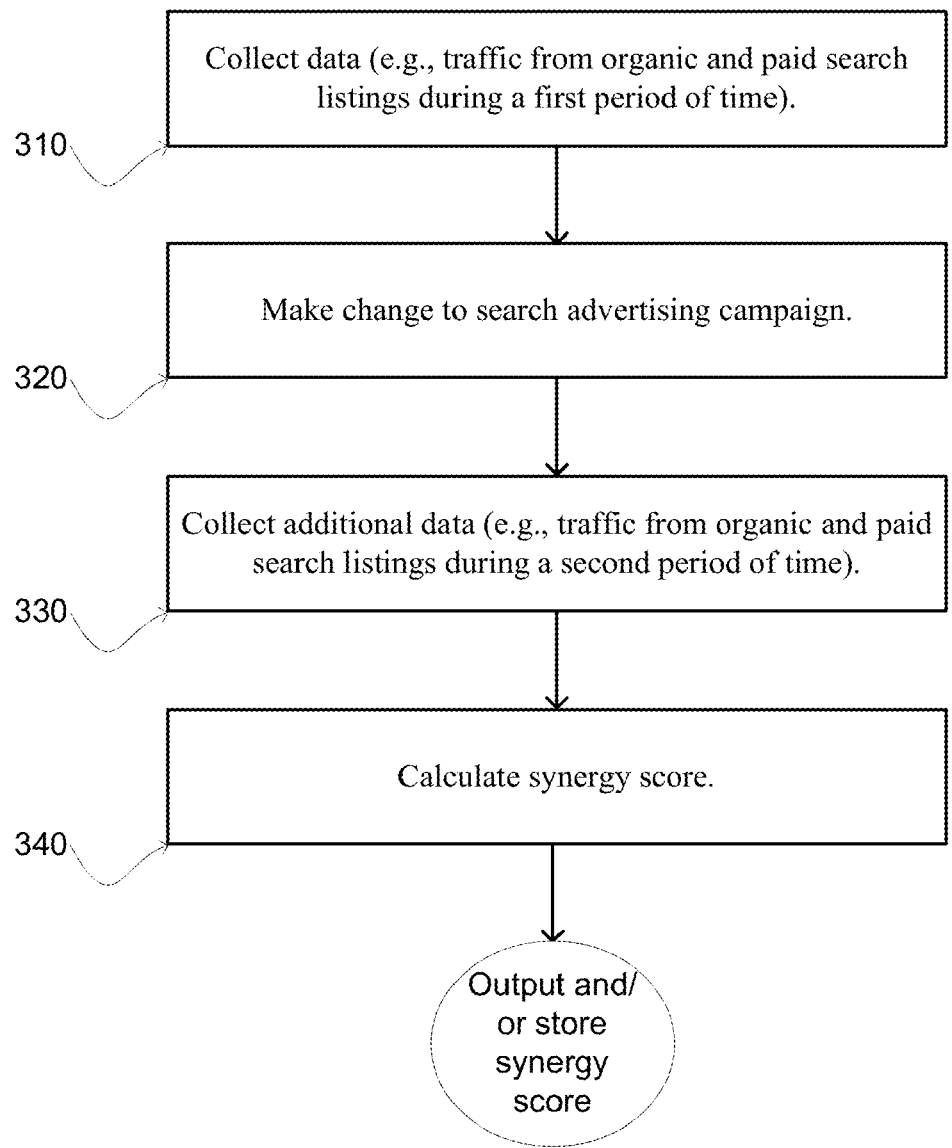
FIG. 3 depicts a process flow diagram illustrating steps taken by a software solution in accordance with at least one embodiment of the invention.

As stated above, the synergy score can be calculated in various ways based of various value metrics. In a first embodiment, as shown in FIG. 3, the synergy score is calculated in terms of website traffic.

During a first period of time (Stage 310), data is collected before a change is made to a paid search engine campaign. As shown in FIG. 3, the data describes a volume of paid search traffic and a volume of organic search traffic to a website via a first search engine (or multiple search engines). The website traffic can be measured by the advertiser's Web analytics system.

In Stage 320, a change is made to a paid search advertising campaign. Possible changes may include starting or stopping advertising on a particular query or set of queries, increasing or decreasing the maximum cost per click bid on a particular query or set of queries, increasing or decreasing the daily budget limit on a particular query or set of queries and increasing or decreasing the number of hours per day that is shown ("dayparting") on a particular query or set of queries. One of skill in the art will appreciate alternative changes, including changes that affect the paid search ad cost, visibility and/or traffic via a query or queries of interest.

By way of example, FIG. 4 shows the effect of stopping advertising on a particular query. When the paid advertisement is removed, the paid traffic drops to zero and the organic traffic jumps by approximately the same amount as the drop in paid traffic, corresponding to a synergy score of approximately −1.0. Note the high degree of variability of search traffic volume for this query day-over-day. Much of this is due to a weekly cycle (lower traffic on weekends), but this does not fully explain the observed variability.

During a second period of time (Stage 330), additional data is collected after the change is made to the paid search engine campaign. The additional data indicates a new volume of paid search traffic and a new volume of organic search traffic to the website via the first search engine. As with the previous traffic data, the website traffic can be measured by the advertiser's Web analytics system. Traffic could be measured for the same length of time in each of the two states.

In Stage 340, the synergy score is determined. This may be done by using the following equation: $(T_{O2}-T_{O1})/(T_{P2}-T_{P1})$, where $T_{O1}$ is the organic traffic during the first period of time (before the change), $T_{O2}$ is the organic traffic during the second period of time (after the change), $T_{P1}$ is the paid traffic in state one and $T_{P2}$ is the paid traffic in state two.

One of skill in the art will appreciate alternative embodiments where one or more stages of FIG. 3 are omitted or rearranged, and where additional stages are included. For example, it is possible that other factors beyond the change in the paid search advertising campaign affect website traffic via a search engine query of interest. For example, in FIG. 4 the weekly cycle (lower traffic on weekends) explains a greater amount of day-to-day organic traffic change than is caused by pausing a paid search advertising campaign. A great improvement is to cycle the change (e.g. by displaying/not displaying an ad on alternate days for a period of two weeks). This assigns each state to each weekday with equal frequency. It also averages long-term trends (seasonality, effects of an offline advertising campaign, among others) across the two states better than would be achieved by operating in state one for seven consecutive days and in state two for seven consecutive days.

Search engine query volume data, like that used in the above embodiment, can also include data regarding how often a query was entered on each search engine in each time period. Such data is available from search engines as the "impressions" value in performance reports for advertisements that were "in market" 100% of the time. Alternatively, it is available in some scenarios via Google's Keyword Tool, Google Trends, and third-party data vendors such as Nielsen and comScore. Another alternative is to model the search engine query volume of the query of interest as a function of organic website traffic volume for queries that are not affected by the change in the paid search marketing program.

In a second embodiment, an advertiser's organic and paid search click through rates (CTRs), $CTR_O$ and $CTR_P$, are defined as the numbers of website visits via organic and paid search links, respectively, in response to the query of interest divided by the search engine query volume for the query of interest. This definition is query-centric rather than ad-centric. Any time a paid ad is not shown, it will not be clicked on, and, based on the above definition, its CTR drops. This is different from the ad-centric CTR provided for paid search ads by most search engines, which is computed based on only those queries for which the ad was shown. This data may be collected over a period of time, for example with daily granularity. For each time interval (e.g. a day), a single point may be plotted on a two-dimensional graph with $CTR_O$ on the y axis and $CTR_P$ on the x axis. A line may be fit to these points, and the slope of this line is the synergy. FIG. 5 provides a collection of data used to calculate organic search CTR values and paid search CTR values. FIG. 6 illustrates a linear fit to the CTR values calculated in FIG. 5.

One benefit of the method for calculating a synergy score as described in relation to the second embodiment is that it is possible to compute the synergy score based on arbitrary paid search advertising campaign changes that the advertiser has carried out in the past, rather than requiring the advertiser to execute new changes to their marketing program purely for the purpose of computing a synergy score. In some cases with high enough query volume, it is possible to compute a synergy score with as little as two days of data (rather than requiring data from a longer time period). The use of the search engine query volume data normalizes many sources of website traffic volume variation (e.g., weekly variations, seasonal variations and the impact of off-line advertising campaigns) that can otherwise confound the synergy score computation.

One drawback of the method in relation to the first embodiment is that the search engine query volume data can introduce a new source of noise. Thus, a third embodiment assesses whether the line described in relation to plotting organic and paid search CTR values is satisfactory. Whether or not the line is satisfactory can be determined using different techniques known in the art. For example, $R^2$ could be calculated. If the $R^2$ value exceeds a threshold value then the associated synergy score (i.e., slope of the line) is acceptable. Otherwise, the synergy score is rejected due to noise unaccounted for by the plot or the data collected.

Predictive Model for Estimating a Synergy Score

Given historical SERPs and synergy scores for an acceptable amount of search engine queries, it is possible to determine a function that estimates a synergy score for a new query/search-engine/change-in-campaign combination based on other parameters rather than measuring it directly. Parameters that may be predictive of the synergy score include the rank of an advertiser's paid listing on a SERP, the click through rate of a paid listing on a SERP, the total number of paid listings on a SERP, the number organic listings of a website in the top N results on a SERP (where N is a small number such as 5, 10, or 30), the sum of click through rates associated with the advertiser's organic listings on a SERP, the rank of each organic listing for a particular advertiser on a SERP and the semantic similarity of the text ("creative") associated with an advertiser's paid and organic listings.

Figure 7:
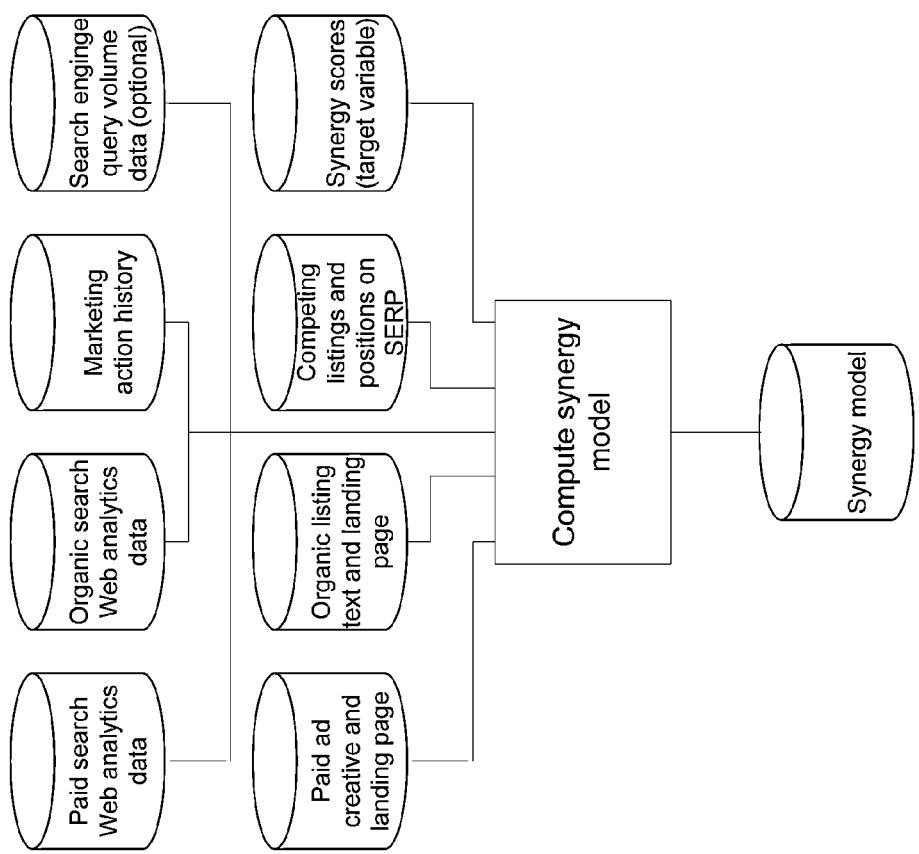
FIG. 7 shows data sources used during the creation of a predictive model for estimating a synergy score in accordance with at least one embodiment of the invention.
Figure 8:
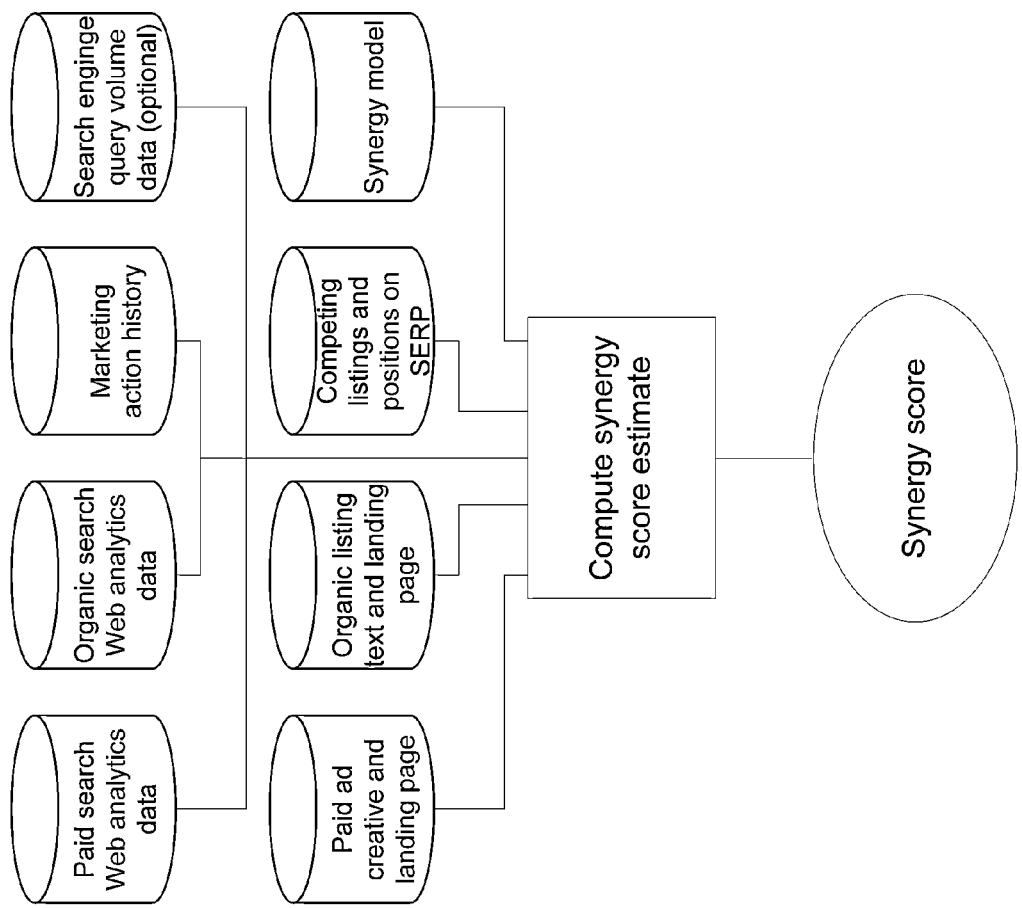
FIG. 8 shows data sources used during the calculation of an estimated synergy score in accordance with at least one embodiment of the invention.

A function for estimating a synergy score based on the above parameters may be designed by a person familiar with the problem space or may be automatically determined from the historical data via a machine learning technique for function approximation such as linear regression, error back propagation neural network learning or C4.5. A process of computing a synergy model via this method is illustrated via the diagram in FIG. 7. A process of computing a synergy score via current data and a synergy model is illustrated via the diagram in FIG. 8.

Even in cases where a predictive model is not used to generate a synergy score for the computation of the total performance metrics (described in the next section), the predictive model may be used to identify when it is necessary to update the synergy score by direct measurement or by the fit to CTR plot method. A significant discrepancy between the synergy score estimated by the predictive model and the stored synergy score indicates that some aspect of the search engine results page has changed in a way that is significant for the paid/organic synergy. This aspect may be the advertiser's organic rankings, a third party or competitor bidding on this search term, a change to a website of a third party or competitor or the advertiser's creative appearing with the paid search ad. Thus, the predictive model can be used to automatically identify such a discrepancy and initiate actions that compute a new synergy score.

Performance Metrics that Quantify the Value of a Change to a Paid Search Campaign The synergy score defined above quantifies the extent to which paid search advertising cannibalizes traffic (and associated actions) that would otherwise have accrued via organic search listings if the score is negative. The synergy score also quantifies the extent to which paid search advertising raises user awareness and drives additional traffic via organic search listings if the score is positive.

Consequently, an accurate synergy score may be used to quantify the performance of a paid search advertisement (e.g., the incremental traffic driven to a website beyond what would have accrued with the organic listings only, and/or other performance metrics). Measuring the performance of a paid search campaign will vary between advertisers and the details of the campaign depending on how each advertiser regards its website performance and its campaign.

For example, in a fourth embodiment, a return on investment (ROI) from incremental traffic to a webpage may be determined based on the following equation:

$$ROI = (Value_{paid} * (1 + \text{Synergy Score}) - Spend_{paid}) / Spend_{paid},$$

where $Value_{paid}$ is the revenue resulting from paid clicks associated with a search query or queries, and $Spend_{paid}$ is the total amount spent on advertising in relation to the search query or queries.

In a fifth embodiment, a cost per incremental value point may be determined based on the following equation:

$$\text{Cost per Incremental value point} = Spend_{paid} / (Value_{paid} * (1 + \text{Synergy})),$$

where $Value_{paid}$ is the number of value-based events resulting from paid clicks. If the synergy score is −1 or less, there is no incremental value and the result of the calculation may be displayed as INF.

In a sixth embodiment, a cost per incremental action may be determined based on the following equation:

$$\text{Cost per Incremental action} = Spend_{paid} / (Value_{paid} * (1 + \text{Synergy})),$$

where $Value_{paid}$ is the number of action-based events resulting from paid clicks. If the synergy score is −1 or less, there is no incremental value and the result of the calculation may be displayed as INF.

Figure 9:
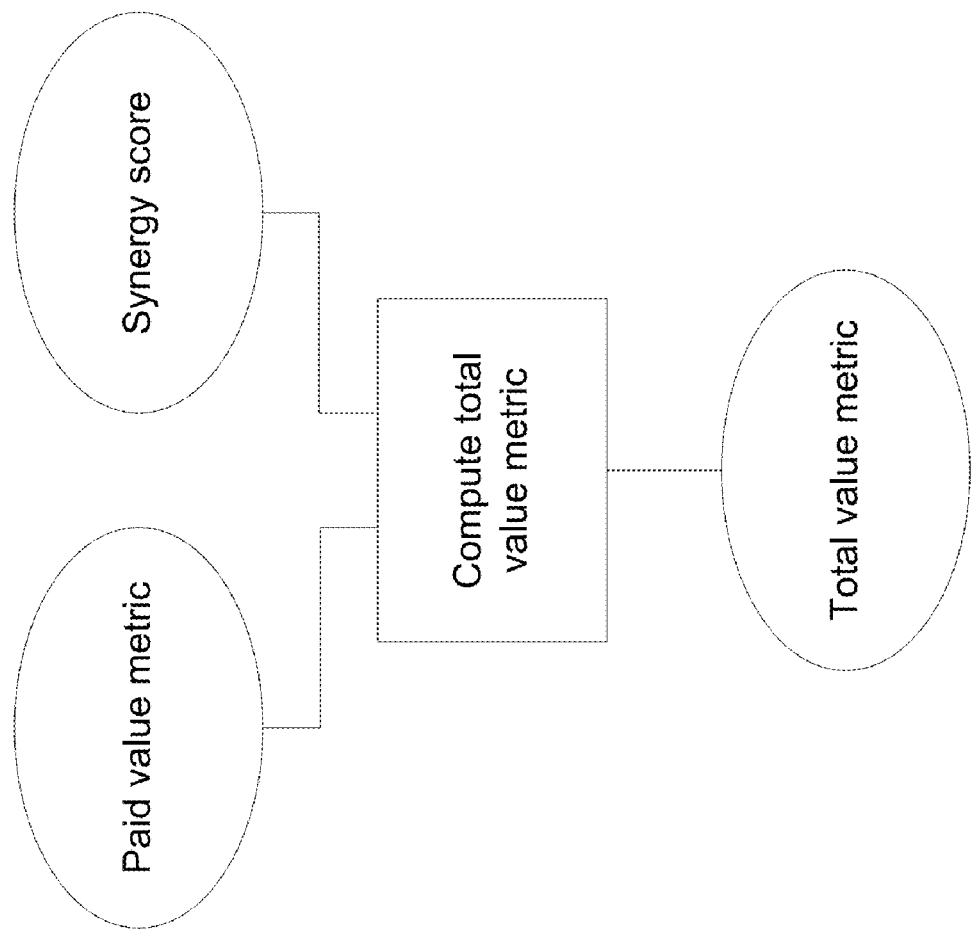
FIG. 9 depicts a process for computing a total value metric in accordance with at least one embodiment of the invention.

The process of calculating a total value metric based on current data and a synergy score is further illustrated via the flowchart in FIG. 9.

Search Engine Marketing Performance Optimization

The incremental performance metrics described above can be used to improve the performance of a search engine advertising campaign in various ways.

Figure 10:
FIG. 10 illustrates a user interface for sorting keywords based on a performance metric that may be presented to a user in accordance with at least one embodiment of the invention.

One approach is to sort keywords/search query by one or more incremental performance metrics. For example, FIG. 10 illustrates how keywords 1-10 could be sorted based on Incremental ROI. An advertiser can then decrease a maximum cost per click bid for keywords with the lowest incremental performance values or with incremental performance values below a predetermined threshold (among other approaches). Resultant marketing budget savings could then be used to bid on new keywords or to raise the maximum cost per click for keywords with the high incremental ROI or with an incremental ROI above a predetermined threshold (among other approaches).

Another approach is to use the incremental performance metric as the target of an optimization-based keyword bidding system. Such a bidding system automatically adjusts the bids subject to spending constraints in ways that are somewhat similar to the manual process described above in relation to FIG. 10.

Yet another approach is to use the synergy score to automatically identify situations in which the text (creative) shown with a webpage or organic listing can be improved. For example, if the synergy score predicted by a model built without variables based on the paid creative is high, yet the measured synergy score is low, then it is likely that the branding value of the paid creative can be improved by extolling positive features of their product or company relative to competitors.

By way of another example, if the synergy score is at or around 0.0, and one or more pages of a website are highly ranked in organic results (e.g., in the top five listings), and the paid ad CTR is high, then it is likely that the paid and organic listings appeal to different segments of the users issuing that query. Thus, it may be beneficial for the advertiser to carry out search engine optimization to try to improve the organic ranking of a landing page that appeals to the same users that click on the paid ad.

It will be apparent to one having ordinary skill in the art that a variety of other approaches may also be used.

Client Architecture

Figure 11:
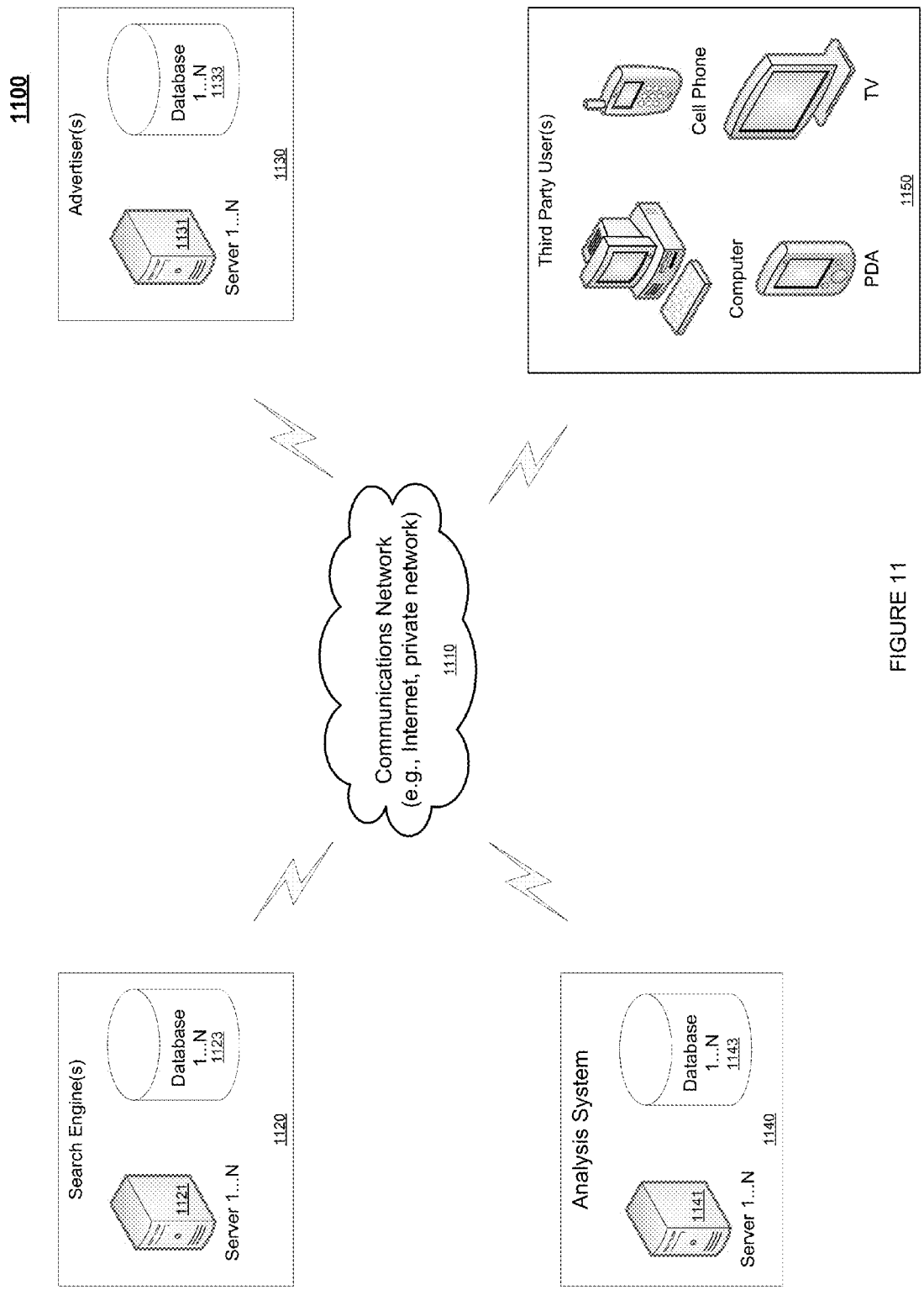
FIG. 11 shows a block diagram depicting a network system 1100 for calculating a synergy score, determining a predictive model for estimating a synergy score and optimizing a paid search advertising campaign in accordance with at least one embodiment of the invention.

Various embodiments of the invention may be designed to operate on computer systems, servers, and/or other like devices. While the details of embodiments of the invention may vary and still be within the scope of the claimed invention, FIG. 11 shows a block diagram depicting a typical network system 1100 for calculating a synergy score, creating a predictive model for estimating a synergy score and optimizing a paid search advertising campaign based on the calculated synergy score and/or the predictive model. The network system 1100 is only one example of a suitable computing environment and is not intended to suggest any limitation as to the scope of use or functionality of the invention. Neither should the network system 1100 be interpreted as having any dependency or requirement relating to any one or combination of components illustrated in the exemplary network system 1100.

Aspects of the invention may be described in the general context of computer-executable instructions, such as program modules, being executed by a computer or server. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

As is shown, the network system 1100 includes a communications network 1110, such as the Internet or a private network, capable of providing communication between devices at search engines 1120, advertisers 1130, a synergy score analysis system 1140, and third party users 1150 described hereinafter. The devices of FIG. 11 communicate with each other via any number of methods known in the art, including wired and wireless communication pathways.

As shown in FIG. 11, a search engine 1120 (operating one or more servers 1121 with one or more database 1123) is accessible by a third party user 1150, an advertiser 1130, and by the analysis system 1140. The third party user 1150 may utilize any number of computing devices that are configured to retrieve information from the World Wide Web ("WWW"), such as a computer, a personal digital assistant ("FDA"), a mobile phone, a television or other network communications-enabled device. The advertiser 1130 is typically a business entity with one or more online or interactive marketing campaigns associated with the search engine 1120. The analysis system 1140 operates one or more servers 1141 capable of Internet-based communication with the search engine 1120 and the advertiser 1130. The analysis system 1140 includes a database 1143 which may be described as a hard disk drive for convenience, but this is certainly not required, and one of ordinary skill in the art will recognize that other storage media may be utilized without departing from the scope of the invention. In addition, one of ordinary skill in the art will recognize that the database 1143, which is depicted for convenience as a single storage device, may be realized by multiple (e.g., distributed) storage devices. One of skill in the art will further appreciate that the analysis system 1140 can be deployed at the advertiser 1130.

As is discussed below, the analysis system 1140 enables the advertiser 1130 to calculate a synergy score for a change to the advertiser's paid search advertising campaign. The analysis system 1140 further enables the advertiser 1130 to create a predictive model for estimating a synergy score. The advertiser 1130 can also use the analysis control system 1140 to optimize (either manually or automatically) a paid search advertising campaign based on the calculated synergy score and/or the predictive model.

As those skilled in the art will appreciate, various intermediary network routing and other elements between the communication network 1110 and the devices depicted in FIG. 11 have been omitted for the sake of simplicity. Such intermediary elements may include, for example, the public-switched telephone network ("PSTN"), gateways or other server devices, wireless network devices, and other network infrastructure provided by Internet service providers ("ISPs").

Figure 12:
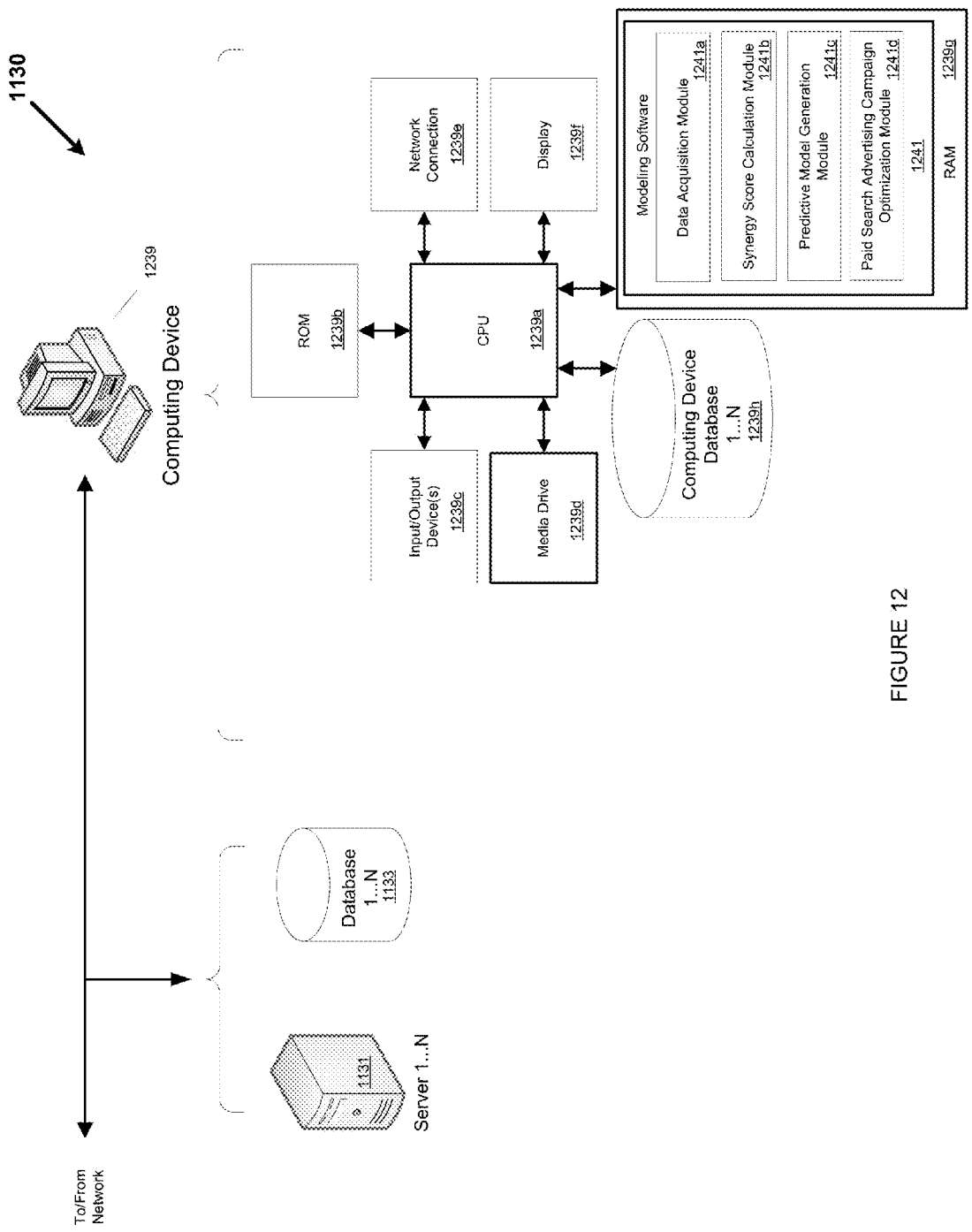
FIG. 12 shows a block diagram depicting an alternative system for calculating a synergy score, determining a predictive model for estimating a synergy score and optimizing a paid search advertising campaign in accordance with at least one embodiment of the invention.

Attention is now drawn to FIG. 12, which depicts an exemplary implementation of the advertiser 1130. As is shown, the advertiser 1130 includes a server 1131 connected to a database 1133, both of which may communicate either directly or indirectly with the communication network 1110. FIG. 12 also includes a computing device/system 1239 configured in accordance with one implementation of the invention. The computing device 1239 may include, but not by way of limitation, a personal computer (PC), a personal digital assistant (PDA), a cell phone, a television (TV), etc., or any other device configured to send/receive data to/from the communication network 1110, such as consumer electronic devices and hand-held devices.

The implementation depicted in FIG. 12 includes a processor 1239$a$ coupled to ROM 1239$b$, input/output devices 1239$c$ (e.g., a keyboard, mouse, etc.), a media drive 1239$d$ (e.g., a disk drive, USB port, etc.), a network connection 1239$e$, a display 1239$f$, memory 1239$g$ (e.g., random access memory (RAM)), and a file storage device 1239$h$.

The storage device 1239$h$ is described herein in several implementations as a hard disk drive for convenience, but this is certainly not required, and one of ordinary skill in the art will recognize that other storage media may be utilized without departing from the scope of the invention. In addition, one of ordinary skill in the art will recognize that the storage device 1239$h$, which is depicted for convenience as a single storage device, may be realized by multiple (e.g., distributed) storage devices.

As shown, a software solution 1241 includes a data acquisition module 1241$a$, a synergy score calculation module 1241$b$, a predictive model generation module 1241$c$ and an paid search advertising campaign optimization module 1241$d$, all of which are implemented in software and are executed from the memory 1239$g$ by the processor 1239$a$. The software 1241 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the invention. Each module 1241a-d functions similarly to the respective functionality described above in relation to collecting data, calculating a synergy score, determining a predictive model that estimates a synergy score and quantify the value of a change to a paid search advertising campaign in order to optimize the paid search advertising campaign.

The exemplary systems and methods of the invention have been described above with respect to the analysis system 1140 and/or the advertiser 1130. One of skill in the art will appreciate alternative embodiments wherein the functions of the analysis system 1140 are performed on other devices in the networked system 1100.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computer implemented method for determining an impact of a change to a paid portion of a search advertising campaign that is associated with a website, comprising:
   identifying a first change made by an advertiser to the paid portion of the search advertising campaign, the first change affecting a cost of the paid portion;
   determining, with a first computing device, one or more effects of the first change, the one or more effects being indicative of:
   a change in a volume of search traffic resulting from the paid portion, and
   a change in a volume of search traffic resulting from an unpaid portion of the search advertising campaign;
   processing, with the first computing device or a second computing device, the one or more determined effects to generate a first synergy score, wherein the first synergy score quantifies an impact of the first change on the volume of search traffic resulting from the unpaid portion; and
   storing the first synergy score in a machine readable memory in association with an indication of the first change.

2. The method of claim 1, wherein the first change includes a change selected from the group consisting of a start of advertising for at least a first keyword, a stoppage of advertising for at least a second keyword, a change to a maximum cost-per-click bid for at least a third keyword, a change to a budget limit for at least a fourth keyword and a change to a time period during which an advertisement is shown in relation to at least a fifth keyword.

3. The method of claim 1, where the one or more determined effects further include one or more effects selected from the group consisting of:
   one or more changes to one or more volumes of traffic from one or more organic listings, paid search listings or organic and paid search listings of the website at one or more search engines,
   one or more changes to one or more click-through-rates associated with one or more organic listings, paid search listings or organic and paid search listings of the website at one or more search engines,
   one or more changes to one or more volumes of orders associated with one or more organic listings, paid search listings or organic and paid search listings of the website at one or more search engines,
   one or more changes to revenue associated with one or more organic listings, paid search listings or organic and paid search listings of the website at one or more search engines,
   one or more changes to one or more number of page views associated with one or more organic listings, paid search listings or organic and paid search listings of the website at one or more search engines, and
   one or more changes to one or more whitepaper downloads associated with one or more organic listings, paid search listings or organic and paid search listings of the website at one or more search engines.

4. The method of claim 3, wherein the processing the one or more determined effects includes comparing a difference between a volume of traffic from an organic listing of the website at a search engine during a time period existing before the first change and a volume of traffic from an organic listing of the website at the search engine during a time period existing after the first change to a difference between a volume of traffic from a paid search listing of the website at the search engine during the time period existing before the first change and a volume of traffic from a paid search listing of the website at the search engine during the time period existing after the first change.

5. The method of claim 3, wherein the processing the one or more determined effects includes plotting, over a period of time, a relationship between a plurality of the one or more changes to the one or more click-through-rates associated with the one or more organic listings of the website at the one or more search engines and a corresponding plurality of the one or more changes to the one or more click-through-rates associated with the one or more paid search listings of the website at the one or more search engines.

6. The method of claim 1, further comprising:
   generating a mathematical model for determining an estimated synergy score based on the first synergy score, and
   storing the mathematical model in a machine readable memory.

7. The method of claim 6, wherein the generating a mathematical model for determining an estimated synergy score is further based on data selected from the group consisting of data representing one or more additional synergy scores associated with the paid portion of the search advertising campaign, data representing one or more synergy scores associated with one or more other paid portions of other search advertising campaigns, data representing one or more rankings of one or more websites in one or more organic listings at one or more search engines during one or more periods of time, data representing one or more rankings of the website in one or more paid search listings at one or more search engines during one or more periods of time, data representing one or more click-through-rates associated with one or more organic listings of the website at one or more search engines, data representing one or more click-through-rates associated with one or more paid search listings of the website at one or more search engines, data representing structure of the website, data representing structure of one or more other websites and data representing a semantic similarity of text associated with one or more organic listings of one or more websites at one or more search engines and text associated with one or more paid search listings of the website at one or more search engines.

8. The method of claim 6, wherein the mathematical model is generated using linear regression technique.

9. The method of claim 6, wherein the mathematical model is generated using neural network technique.

10. The method of claim 6, further comprising:
estimating, using mathematical model, an estimated synergy score.

11. The method of claim 10, further comprising:
comparing the first synergy score to the estimated synergy score; and
responsive to the comparing, generating a second synergy score.

12. The method of claim 1, further comprising:
determining a value of the first change based at least in part on the first synergy score, a revenue associated with the paid portion, and a cost associated with the paid portion.

13. The method of claim 12, wherein the value is determined by dividing the revenue by the cost to generate a resulting quotient and multiplying the resulting quotient by a scaling factor based on the first synergy score.

14. The method of claim 12, wherein the value is determined by dividing the cost by the revenue to generate a resulting quotient and multiplying the resulting quotient by a scaling factor based on the first synergy score.

15. The method of claim 12, further comprising:
determining, based on the value, an adjustment to be made to the paid portion.

16. The method of claim 1 wherein the processing includes generating a first synergy score based at least in part upon a relationship (R) comprising:

$$R=(TO2-TO1)/(TP2-TP1)$$

wherein TO1 represents volume of search traffic from the unpaid portion before the first change, TO2 represents volume of search traffic from the unpaid portion after the first change, TP1 represents volume of search traffic from the paid portion before the first change, TP2 represents volume of search traffic from the paid portion after the first change.

17. A non-transitory computer readable medium storing computer executable instructions which when executed on a computer simulate a process, the instructions comprising instructions to:
identify a first change made by an advertiser to a paid portion of the search advertising campaign, the first change affecting a cost of the paid portion;
determine one or more effects of the first change, the one or more effects being indicative of:
a change in a volume of search traffic resulting from the paid portion, and
a change in a volume of search traffic resulting from an unpaid portion of the search advertising campaign;
process the one or more determined effects to generate a first synergy score, wherein the first synergy score quantifies an impact of the first change on the volume of search traffic resulting from the unpaid portion; and
store the first synergy score in a machine readable memory in association with an indication of the first change.

18. The computer readable medium of claim 17, wherein the first change includes a change selected from the group consisting of a start of advertising for at least a first keyword, a stoppage of advertising for at least a second keyword, a change to a maximum cost-per-click bid for at least a third keyword, a change to a budget limit for at least a fourth keyword, and a change to a time period during which an advertisement is shown in relation to at least a fifth keyword.

19. The computer readable medium of claim 17, wherein the one or more determined effects further include one or more effects selected from the group consisting of:
one or more changes to one or more volumes of traffic from one or more organic listings, paid search listings or organic and paid search listings of the website at one or more search engines,
one or more changes to one or more click-through-rates associated with one or more organic listings, paid search listings or organic and paid search listings of the website at one or more search engines,
one or more changes to one or more volumes of orders associated with one or more organic listings, paid search listings or organic and paid search listings of the website at one or more search engines,
one or more changes to revenue associated with one or more organic listings, paid search listings or organic and paid search listings of the website at one or more search engines,
one or more changes to one or more number of page views associated with one or more organic listings, paid search listings or organic and paid search listings of the website at one or more search engines, and
one or more changes to one or more whitepaper downloads associated with one or more organic listings, paid search listings or organic and paid search listings of the website at one or more search engines.

20. The computer readable medium of claim 19, wherein the instructions to process the one or more determined effects includes instructions to compare a difference between a volume of traffic from an organic listing of the website at a search engine during a time period existing before the first change and a volume of traffic from an organic listing of the website at the search engine during a time period existing after the first change to a difference between a volume of traffic from a paid search listing of the website at the search engine during the time period existing before the first change and a volume of traffic from a paid search listing of the website at the search engine during the time period existing after the first change, or to plot, over a period of time, a relationship between a plurality of the one or more changes to the one or more click-through-rates associated with the one or more organic listings of the website at the one or more search engines and a corresponding plurality of the one or more changes to the one or more click-through-rates associated with the one or more paid search listings of the website at the one or more search engines.

21. The computer readable medium of claim 17, wherein the instructions further comprise instructions to:
generate a mathematical model for determining an estimated synergy score based on the first synergy score and data selected from the group consisting of data representing one or more additional synergy score associated with the paid portion of the search advertising campaign, data representing one or more synergy scores associated with one or more other paid portions of other search advertising campaigns, data representing one or more ranking of one or more websites in one or more organic listings at one or more search engines during one or more periods of time, data representing one or more ranking of the website in one or more paid search listings at one or more search engines during one or more periods of time, data representing one or more click-through-rates associated with one or more organic listings of the website at one or more organic listings of the website at one or more search engines, data representing one or more click-through-rates associated with one or more paid search listings of the website at one or more search engines, data representing structure of the website, data representing structure of one or more other websites and data representing a sematic similarity of text associated with one or more organic listings of one or more websites at one or more search engines and text associated with one or more paid search listings of the website at one or more search engine; and store the mathematical model in a machine readable memory.

22. The computer readable medium of claim 21, wherein the mathematical model is generated using a linear regression technique or neural network technique.

23. The computer readable medium of claim 21, wherein the instructions further comprise instructions to:

estimate, using the mathematical model, an estimated synergy score.

24. The computer readable medium of claim 23, wherein the instructions further comprise instructions to:

compare the first synergy score to the estimated synergy score; and responsive to the comparison, generate a second synergy score.

25. The computer readable medium of claim 17, wherein the instructions further comprise instructions to:

determine a value of the first change based at least in part on the first synergy score, a revenue associated with the paid portion, and a cost associated with the paid portion.

26. The computer readable medium of claim 25, wherein the value is determined by dividing the revenue by the cost to generate a resulting first quotient and multiplying the resulting first quotient by a scaling factor based on the first synergy score or by dividing the cost by the revenue to generate a resulting second quotient and multiplying the resulting second quotient by a scaling factor based on the first synergy score.

27. The computer readable medium of claim 25, wherein the instructions further comprise instructions to:

determine, based on the value, an adjustment to be made to the paid portion.

28. The computer readable medium of claim 17, wherein the processing includes generating a first synergy score based at least in part upon a relationship (R) comprising:

$$R=(TO2-TO1)/(TP2-TP1)$$

wherein TO1 represents volume of search traffic from the unpaid portion before the first change, TO2 represents volume of search traffic from the unpaid portion after the first change, TP1 represents volume of search traffic from the paid portion before the first change, TP2 represents volume of search traffic from the paid portion after the first change.

29. A system for measuring an impact of a change to a paid portion of a search advertising campaign that is associated with a website, comprising:

at least one processor;

a network interface;

a memory, operatively coupled to the processor, for storing logical instructions wherein execution of the logical instruction by the processor results in performing of at least the following operations:

identifying a first change made by an advertiser to the paid portion of the search advertising campaign, the first change affecting a cost of the paid portion;

determining one or more effects of the first change, the one or more effects being indicative of:

a change in a volume of search traffic resulting from the paid portion, and a change in a volume of search traffic resulting from an unpaid portion of the search advertising campaign;

processing the one or more determined effects to generate a first synergy score, wherein the first synergy score quantifies an impact of the first change on the volume of search traffic resulting from the unpaid portion; and storing the first synergy score in a machine readable memory in association with an indication of the first change.

30. The system of claim 29, wherein the first change includes a change selected from the group consisting of a start of advertising for at least a first keyword, a stoppage of advertising for at least a second keyword, a change to a maximum cost-per-click bid for at least a third keyword, a change to a budget limit for at least a fourth keyword, and a change to a time period during which an advertisement is shown in relation to at least a fifth keyword.

31. The system of claim 29, wherein the one or more determined effects further includes one or more effects selected from the group consisting of:

one or more changes to one or more volumes of traffic from one or more organic listings, paid search listings or organic and paid search listings of the website at one or more search engines, one or more changes to one or more click-through-rates associated with one or more organic listings, paid search listings or organic and paid search listings of the website at one or more search engines, one or more changes to one or more volumes of orders associated with one or more organic listings, paid search listings or organic and paid search listings of the website at one or more search engines, one or more changes to revenue associated with one or more organic listings, paid search listings or organic and paid search listings of the website at one or more search engines, one or more changes to one or more number of page views associated with one or more organic listings, paid search listings or organic and paid search listings of the website at one or more search engines, and one or more changes to one or more whitepaper downloads associated with one or more organic listings, paid search listings or organic and paid search listings of the website at one or more search engines.

32. The system of claim 31, wherein the processing the one or more determined effects includes comparing a difference between a volume of traffic from an organic listing of the website at a search engine during a time period existing before the first change and a volume of traffic from an organic listing of the website at the search engine during a time period existing after the first change to a difference between a volume of traffic from a paid search listing of the website at the search engine during the time period existing before the first change and a volume of traffic from a paid search listing of the website at the search engine during the time period existing after the first change, or to plotting, over a period of time, a relationship between a plurality of the one or more changes to the one or more click-through-rates associated with the one or more organic listings of the website at the one or more search engines and a corresponding plurality of the one or more changes to the one or more click-through-rates associated with the one or more paid search listings of the website at the one or more search engines.

33. The system of claim 29, wherein the execution of the logical instructions by the processor resulting in the performing of at least the following additional operations:

generating a mathematical model for determining an estimated synergy score based on the first synergy score; and storing the mathematical model in a machine readable memory.

34. The system of claim 33, wherein the generating a mathematical model for determining an estimated synergy score is further based on data selected from the group consisting of data representing one or more additional synergy score associated with the paid portion of the search advertising campaign, data representing one or more synergy scores associated with one or more other paid portions of other search advertising campaigns, data representing one or more ranking of one or more websites in one or more organic listings at one or more search engines during one or more periods of time, data representing one or more rankings of the website in one or more paid search listings at one or more search engines during one or more periods of time, data representing one or more click-through-rates associated with one or more organic listings of the website at one or more organic listings of the website at one or more search engines, data representing one or more click-through-rates associated with one or more paid search listings of the website at one or more search engines, data representing structure of the website, data representing structure of one or more other websites and data representing a sematic similarity of text associated with one or more organic listings of one or more websites at one or more search engines and text associated with one or more paid search listings of the website at one or more search engine.

35. The system of claim 33, wherein the mathematical model is generated using a linear regression technique or a neural network technique.

36. The system of claim 33, wherein the execution of the logical instructions by the processor results in the performing of at least the following additional operations:

estimating, using the mathematical model, an estimated synergy score.

37. The system of claim 36, wherein the execution of the logical instructions by the processor results in the performing of at least the following additional operations:

comparing the first synergy score to the estimated synergy score; and responsive to the comparing, generating a second synergy score.

38. The system of claim 29, wherein the execution of the logical instructions by the processor results in the performing of at least the following additional operations:

determining a value for the first change based at least in part on the first synergy score, a revenue associated with the paid search campaign, and a cost associated with the paid search campaign.

39. The system of claim 38, where the value is determined by dividing the revenue by the cost to generate a resulting first quotient and multiplying the resulting first quotient by a scaling factor based on the first synergy score or by dividing the cost by the revenue to generate a resulting second quotient and multiplying the resulting second quotient by a scaling factor based on the first synergy score.

40. The system of claim 38, wherein the execution of the logical instructions by the processor results in the performing of at least the following additional operation:

determining, based on the value, an adjustment to be made to the paid portion.

41. The system of claim 29, wherein the processing includes generating a first synergy score based at least in part upon a relationship (R) comprising:

$$R=(TO2-TO1)/(TP2-TP1)$$

wherein TO1 represents volume of search traffic from the unpaid portion before the first change, TO2 represents volume of search traffic from the unpaid portion after the first change, TP1 represents volume of search traffic from the paid portion before the first change, TP2 represents volume of search traffic from the paid portion after the first change.

42. A system, comprising:
at least one processor;
a network interface;
one or more memories, operatively coupled to the processor, for storing logical instructions wherein execution of the logical instructions by the processor results in the performing of at least the following operations:

receiving, through the network interface during a first period of time, first traffic data and second traffic data measured by a Web analytic system wherein the first traffic data is indicative of search traffic to a website resulting from a paid portion of a search advertising campaign and the second traffic data is indicative of search traffic to the website resulting from an unpaid portion of the search advertising campaign;

making a change to the paid portion of the search advertising campaign in order to create a modified advertising campaign, the change being initiated by an advertiser and affecting a cost of the paid portion;

receiving, during a second period of time, third traffic data and fourth traffic data wherein the third traffic data is indicative of search traffic associated with a paid portion of the modified advertising campaign and the fourth traffic data is indicative of search traffic associated with an unpaid portion of the modified advertising campaign;

generating a synergy score based upon the at least first traffic data, the second traffic data, the third traffic data and the fourth traffic data, wherein the synergy score quantifies an impact of the change on the at least one of a volume of traffic to the website resulting from the paid portions and the value of the traffic to the website resulting from the unpaid portions; and storing the synergy score in the one or more memories in association with an indication of the change.

43. The system of claim 42 wherein the generating includes determining the synergy score based at least in part upon a relationship (R) comprising:

$$R=(TO2-TO1)/(TP2-TP1)$$

wherein TO1 represents the second traffic data, TO2 represents the fourth traffic data, TP1 represents the first traffic data and TP2 represents the third traffic data.

44. The system of claim 42 wherein the volume of traffic comprises traffic arising from unpaid search listings.

45. The system of claim 42 wherein the change comprises beginning advertising for at least a first keyword.

46. The system of claim 45 wherein the change further comprises discontinuing advertising for at least a second keyword.

47. The system of claim 42 wherein the change comprises discontinuing advertising for at least one keyword.

48. The system of claim 42 wherein the change comprises modifying a maximum cost-per-click bid for at least one keyword.

49. The system of claim 42 wherein the change comprises modifying a change to a budget limit for at least one keyword.

50. The system of claim 42 wherein the change comprises modifying a time period during which an advertisement is shown in relation to at least one keyword.

* * * * *